(12) United States Patent
Saputo et al.

(10) Patent No.: US 6,257,550 B1
(45) Date of Patent: Jul. 10, 2001

(54) DRAIN VALVE ADAPTER FOR AQUEOUS CONTAINER

(75) Inventors: Richard A. Saputo, Tarzana, CA (US); Hua Hsiang Lin, Kowloon (HK); Yaw-Yuan Hsu, Taipei (TW)

(73) Assignee: Intex Recreation Corp., Long Beach, CA (US)

( * ) Notice: Subject to any disclaimer, the term of this patent is extended or adjusted under 35 U.S.C. 154(b) by 0 days.

(21) Appl. No.: 09/544,014

(22) Filed: Apr. 6, 2000

(51) Int. Cl.[7] ........................................... F16L 29/00
(52) U.S. Cl. ................................ 251/149.1; 251/149.4
(58) Field of Search .......................... 251/149.1, 149.2, 251/149.4, 149.8

(56) References Cited

U.S. PATENT DOCUMENTS

| | | |
|---|---|---|
| 3,608,735 | 9/1971 | Smith . |
| 4,756,349 | * 7/1988 | Atkins ........................ 251/149.1 X |
| 4,768,537 | 9/1988 | Tash . |
| 4,862,918 | * 9/1989 | Schroeder .................. 251/149.4 X |
| 5,280,876 | * 1/1994 | Atkins ......................... 251/149.1 |
| 5,862,843 | 1/1999 | Corbitt, 111 . |
| 5,901,887 | 5/1999 | Wark . |

* cited by examiner

Primary Examiner—Kevin Lee
(74) Attorney, Agent, or Firm—Lewis, D'Amato, Brisbois & Bisgaard LLP

(57) ABSTRACT

A drain valve adapter is for use with a hose and a drain valve mounted to a container, wherein the drain valve of the container defines a passageway for aqueous solution. The drain valve adapter comprises a tubular body having a mating member and a plunger member which are in fluid communication with each other, the plunger member being configured to be disposed inside the drain valve along the passageway. The drain valve further comprises a ring cap defining a through hole and being disposed in surrounding relation to the tubular body for releasably engaging the drain valve. The plunger member has at least one prong extending therefrom to force open a drain plug blocking the passageway of the drain valve. Preferably, the plunger member has a plurality of prongs extending therefrom. The plurality of prongs define spaces therebetween to allow free flow of the aqueous solution in the container. The mating member has a threaded outer surface for engaging with a female coupler of a standard garden hose. Alternatively, the mating member has a plurality of compression fit sleeves of varying diameters for engaging hoses having various conduit diameters.

29 Claims, 2 Drawing Sheets

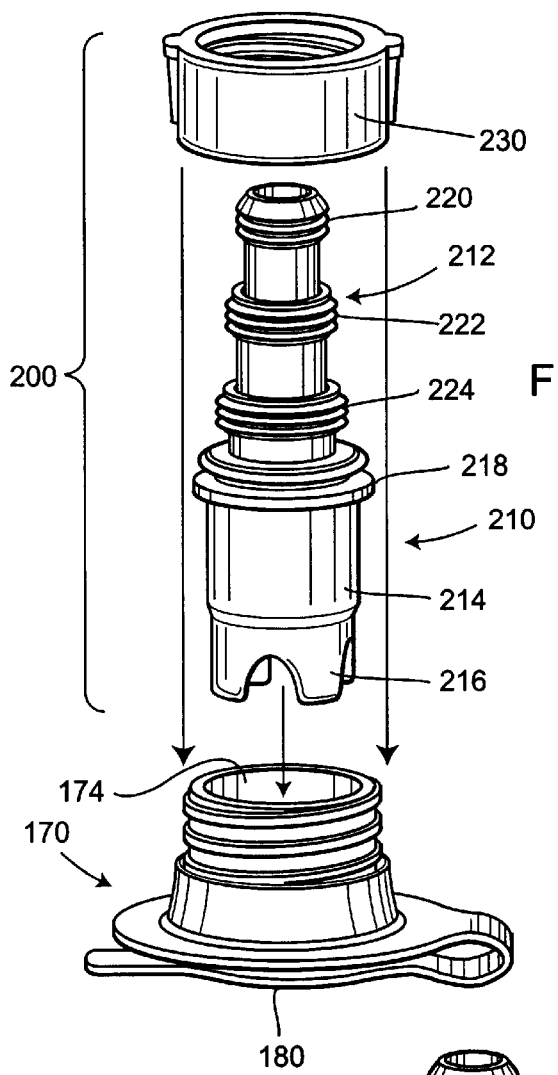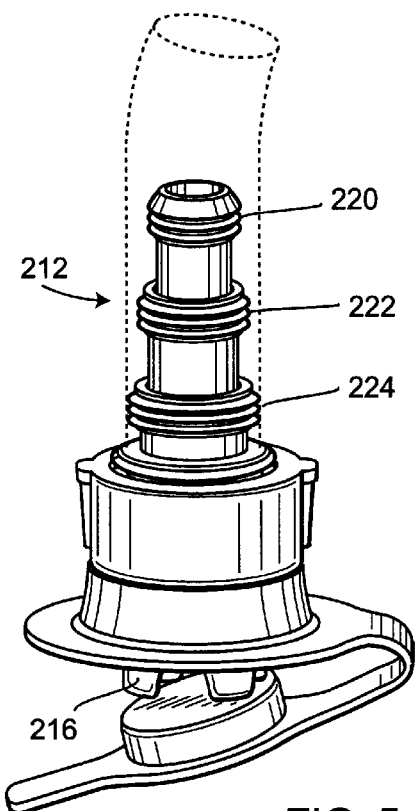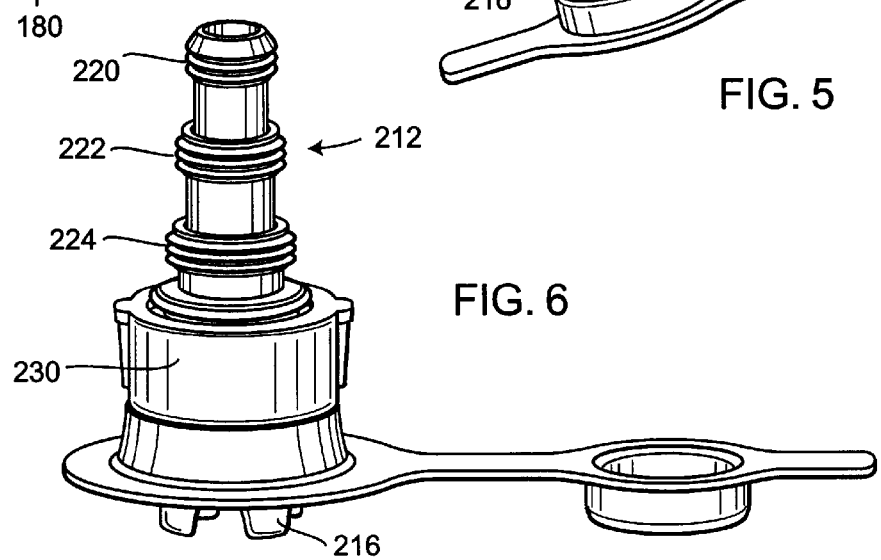

DRAIN VALVE ADAPTER FOR AQUEOUS CONTAINER

BACKGROUND OF THE INVENTION

1. Field of the Invention

The present invention relates to a drain valve adapter, and more particularly, to a drain valve adapter for use with aqueous solution containers, such as above-the-ground inflatable pools.

2. Discussion of the Related Art

Portable, as well as stationary, above-the-ground pools have increased in popularity over the last several years because of their low cost and portability when compared to in-the-ground pools. By their definition, portable pools can be easily moved and/or easily stored for a long term storage, such as during winter. Similarly, stationary above-the-ground pools may be drained for their winter season.

Although many above-the-ground pools provide drain valves for emptying the water, such valves are not adaptable to ordinary garden hoses for properly routing the water to a street drain. Moreover, none provide drain valve adapters that can be connected to ordinary garden or water hoses.

Incidents occur when the draining of a fluid from a portable or stationary container has the fluid discharged in a location causing property or environmental damages and flooding. These incidents could be avoided if a hose could be connected to the drain valve in order to convey the fluid to an appropriate discharge location.

In addition, even if the drain valve is constructed to connect with a conventional standard garden hose used in the United States, such drain valve is not useful when the container, such as a pool, is used in foreign countries using garden hoses of varying diameters.

Therefore, there is a need in the art for a drain valve adapter that can be easily attachable to and removable from a drain valve to provide controlled draining of water or other aqueous solution contained in a container, such as a pool.

SUMMARY OF THE INVENTION

Accordingly, the present invention is directed to a drain valve adapter that substantially obviates one or more of the problems due to limitations and disadvantages of the related art.

An object of the present invention is to provide a drain valve adapter that can be used with ordinary garden or water hoses to control the discharge of the water from portable or stationary above-the-ground swimming pools, lap pools or portable or stationary spas.

Another object of the present invention is to provide a drain valve adapter which accommodates various size hoses, with or without threaded end fittings.

Another object of the present invention is to allow the user to connect an ordinary standard hose to the pool's drain plug and empty the water without property or environmental damage nor create a safety problem by making an area flooded and/or slippery.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a drain valve adapter is for use with a hose and a drain valve mounted to a container, wherein the drain valve defines a passageway for aqueous solution. The drain valve adapter comprises a tubular body having a mating member and a plunger member which are in fluid communication with each other, the plunger member being configured to be disposed inside the drain valve along the passageway. The drain valve further comprises a ring cap defining a through hole and being disposed in surrounding relation to the tubular body for releasably engaging the drain valve.

According to one aspect of the invention, the plunger member has at least one prong extending therefrom to force open a drain plug blocking the passageway of the drain valve. Preferably, the plunger member has a plurality of prongs extending therefrom. The plurality of prongs define spaces therebetween to allow free flow of the aqueous solution in the container. Alternatively, the plunger member is sufficiently long to force open a drain plug blocking the passageway of the drain valve.

According to another aspect of the invention, the mating member has a threaded outer surface for engaging with a female coupler of a standard garden hose. Alternatively, the mating member has at least one compression fit sleeve for engaging the hose. Preferably, the mating member has a plurality of compression fit sleeves of varying diameters for engaging hoses having various conduit diameters.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

FIG. 4 illustrates an exploded perspective view of a drain valve adapter according to a second embodiment;

FIG. 5 illustrate the drain valve adapter placed in the drain valve with the garden hose shown in phantom lines; and FIG. 6 illustrates the drain valve adapter fully situated in the drain valve without the garden hose attached thereto.

DETAILED DESCRIPTION OF THE PREFERRED EMBODIMENTS

With reference to the drawings, and in particular to FIGS. 1–6 thereof, a drain valve adapter embodying the principles and concepts of the present invention will be described.

Figure 1:
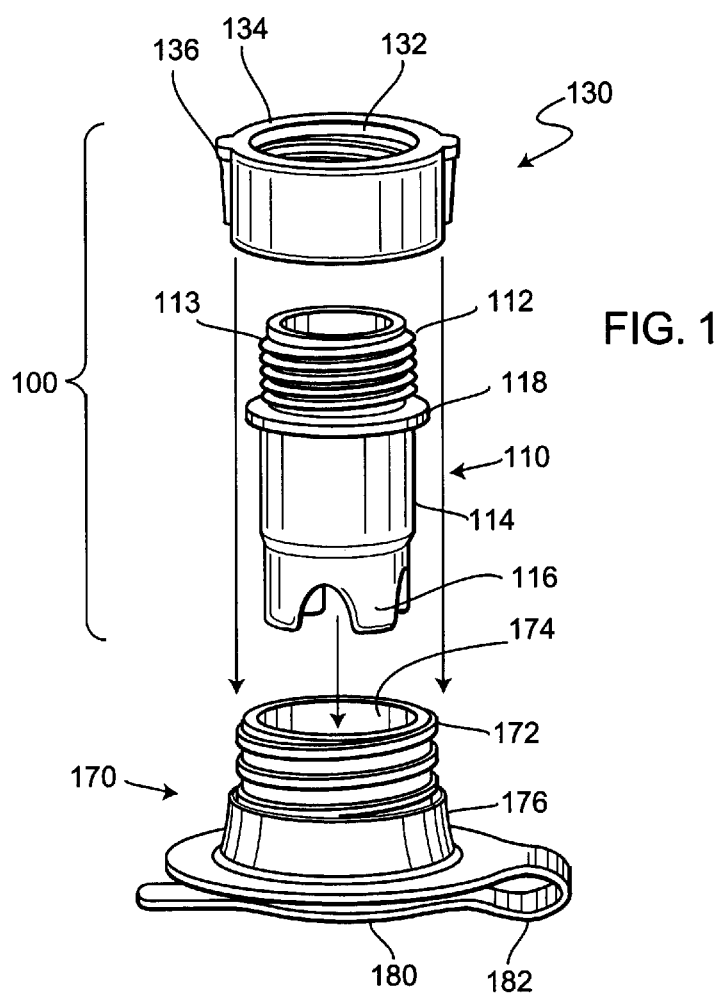
FIG. 1 illustrates an exploded perspective view of a drain valve adapter according to a first embodiment.
Figure 2:
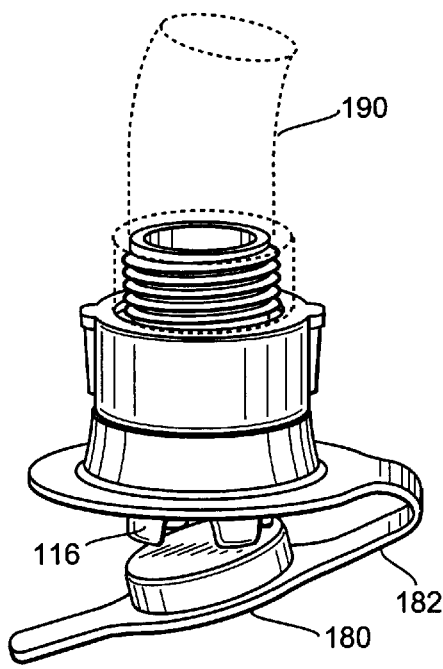
FIG. 2 illustrate the drain valve adapter placed in the drain valve with a garden hose shown in phantom lines.
Figure 3:
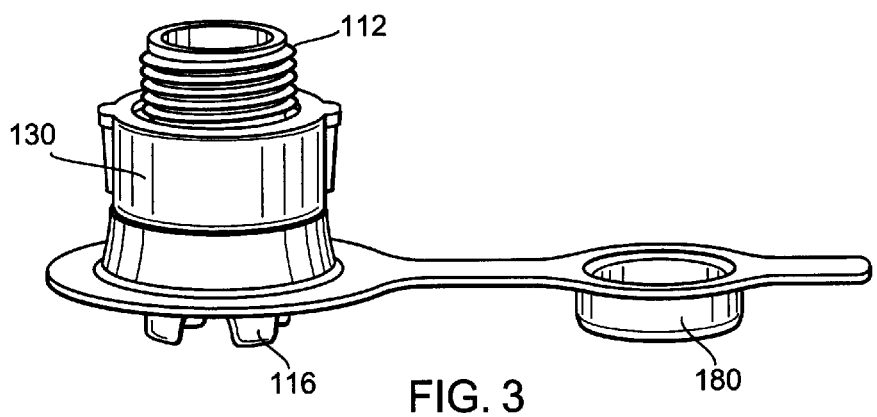
FIG. 3 illustrates the drain valve adapter fully situated in the drain valve without the garden hose attached thereto.

FIGS. 1–3 illustrate a first embodiment of the present invention. In particular, FIG. 1 illustrates an exploded perspective view of a drain valve adapter 100 according to the first embodiment. FIG. 2 illustrate the drain valve adapter 100 placed in the drain valve 170 with a garden hose shown in phantom lines. FIG. 3 illustrates the drain valve adapter 100 fully situated in the drain valve 170 without the garden hose attached thereto.

Referring to FIGS. 1 and 2, a drain valve 170 is equipped with a threaded outlet 172 and a drain body 176 which extends from a container, such as an above-ground inflatable pool commonly used by adults and children during summer. The drain valve 170 also preferably includes a drain plug 180 which fits into an inside outlet passageway defined by the drain valve 170. The threaded outlet 172 is positioned on the outer surface of the inflatable pool. The drain plug 180 is positioned inside of the inflatable pool and blocks the water flow from the inside of the container. Because the drain valve 170 is located near the bottom of the inflatable pool, when the pool is filled with water, the drain plug 180 is biased to close the passageway defined by the drain valve 170 due to the water pressure. The flange portion 182 of the drain plug 180 is preferably attached to the flexible side wall of the pool which is typically made of a flexible inflatable material, such as polyvinylchloride sheeting (typically referred to as PVC), thermoplastic impregnated cloth or other materials known to one of ordinary skill in the art.

The drain valve 170 is commonly equipped with a threaded cap which has a matching inner threads to tightly couple with the outer threads of the threaded outlet 172. The water passageway of the drain valve 170 is opened by removing the threaded cap and by removing the drain plug 180. The drain valve 170 is made with any suitable material known to one of ordinary skill in the art, such as plastic, metal, etc.

Referring to FIGS. 1 and 2, the drain valve adapter 100 includes an elongated tubular body 110 and a threaded ring cap 130 which is positioned in surrounding relation to the tubular body 110. The tubular body 110 has a threaded cylindrical mating member 112 and a lower cylindrical plunger member 114 having a plurality of prongs 116 extending therefrom. In the preferred embodiment, the plunger member 114 and the prongs 116 are used to force open the drain plug 180.

The mating member 112 and the plunger member 114 are connected via a collar 118 thereby forming an integrated single piece tubular body 110. The collar 118 also acts as a gasket or washer to provide a fluid and vapor tight seal between both the drain valve 170 and the drain valve adapter 110. The collar 118 extends radially and is slightly larger in diameter than an opening 174 defined by the drain body 176. A shell diameter of the plunger member 114 is slightly smaller than the diameter of the opening 174 to allow the plunger member 114 to be snuggly but easily fitted into the passageway.

Preferably, the length of the plunger member 114 is sufficient long to allow the prongs 116 to extend beyond the wall where the drain valve 170 is mounted. As shown in FIGS. 2 and 3, when the drain valve adapter 100 is fully installed in the drain valve 170, the prongs 116 push the drain plug 180 thereby opening the passageway for water to flow therethrough. In an alternative embodiment, the plungers 116 may be in any form or shape so long as they are sufficiently long to push the drain plug 180 away from its housing.

The mating member 112 of the drain valve adapter 100 is provided with outer threads 113. The diameter of the mating member 112 and the pitch of the threads 113 allow an ordinary garden hose couplers to be threadably mated to the tubular body 110. One of ordinary skill in the art recognizes that garden hose threaded couplers are standardized in the industry in the United States. Regardless of the size of the garden hose, the various threaded male and female connectors will mate. The couplers are typically made with plastic or brass. In this regard, the mating member 112 described above is specifically sized and threaded to accept all female standard hose couplers on the market in the United States. Alternatively, while a male type mating member 112 is disclosed in the illustrated embodiment, it would be possible to provide a female standard hose coupler arrangement on the upper end of the mating member 112 to accept standard male hose couplers.

The ring cap 130 of the drain valve adapter 100 has a through opening 132 to receive the mating member 112 of the tubular body 110. The ring cap 130 has a flange 134 which forms a fluid tight seal when pressed against the collar 118 of the tubular body 110. In addition, the ring cap 130 has oppositely position notch members 136 protruding from the side wall to enhance gripping of the ring cap 130 during engaging and disengaging the drain valve 170.

FIGS. 4–6 illustrate a second embodiment of the present invention. In particular, FIG. 4 illustrates an exploded perspective view of a drain valve adapter 200. FIG. 5 illustrates the drain valve adapter 200 placed in the drain valve 170 with a garden hose shown in phantom lines. FIG. 6 illustrates the drain valve adapter 200 fully situated in the drain valve 170 without the garden hose attached thereto.

The drain valve adapter 200 according to the second embodiment of the present invention is similar to that of the first embodiment, except that the mating member 212 of the tubular body 210 is universally constructed and adapted to be used with garden hoses of various diameters. Preferably, hoses without the end couplers are suitable for use with the second embodiment of the present invention.

Referring to FIGS. 4 and 5, the drain valve adapter 200 includes an elongated tubular body 210 and a threaded ring cap 230 which is positioned in surrounding relation to the tubular body 210. The tubular body 210 has a plurally grooved cylindrical mating member 212 and a lower cylindrical plunger member 214 having a plurality of prongs 216 extending therefrom. In the preferred embodiment, the plunger member 214 and the prongs 216 are used to force open the drain plug 180 against the pressure of water pushing against the drain plug 180.

The mating member 212 and the plunger member 214 are connected via a collar 218 thereby forming an integrated single piece tubular body 210. The collar 218 also acts as a gasket or washer to provide a fluid and vapor tight seal between both the drain valve adapter and the ring cap 230. The collar 218 extends radially and is slightly larger in diameter than an opening 174. A shell diameter of the plunger member 214 is slightly smaller than the diameter of the opening 174 to allow the plunger member 214 to be snuggly fitted into the passageway.

The mating member 212 has a frustoconical shaped body for receiving thereon garden hoses of various diameters. In particular, there are preferably three sets of compression fit grooves or sleeves 220, 222 and 224 formed on the mating member 212. The three sets of grooves 220, 222 and 224 share the same longitudinal axis and are aligned in decreasing diameter from the collar 218 of the tubular body 210, wherein the grooves with the largest diameter being the nearest to the collar 218. Because of varying diameters, each set of grooves 220, 222 and 224 can receive a garden hose of varying diameters.

In the second embodiment, the compression fit grooves or sleeves 220, 222 and 224 are used in lieu of threads. Therefore, the garden hose having either a male or a female coupler cannot be used with the second embodiment. Instead, ordinary garden hoses without the couplers may be used. Alternatively, the grooves formed on the mating member 212 of the drain valve adapter 200 may be threads having pitches and diameters corresponding to mostly commonly used garden hose couplers in the world.

The other components of the drain valve adapter 200 are identical to that of the first embodiment and therefore their description are incorporated herein by reference.

With regard to the materials for the drain valve adapters 100 and 200, they are preferably made with plastic by injection molding press, but other suitable materials that are known to one of ordinary skill in the art may also be used, such as, brass, aluminum, steel, etc.

The operation of the present invention will be described in connection with, for purposes of illustration, the drain valve adapter 100 of the first embodiment.

To drain water contained in an above-the-ground inflatable pool equipped with a drain valve 170, a valve cap which blocks the water passageway from the outside is first removed. The drain valve 170 is typically equipped with a drain plug 180 which blocks the water passageway from the inside of the pool.

With the valve cap remove, a ring cap 130 is placed in surrounding relation to the tubular body 110. An ordinary garden hose having a standard female coupler is installed onto the mating member 112. The threads inside the female coupler of the hose matches the outer threads 113 of the mating member 112 of the drain valve adapter 100 for a water tight fit. The entire adapter-hose assembly is then placed inside the water passageway of the drain valve 170.

Next the ring cap 130 having an inner thread matching the outer thread of the drain valve 170 is placed against the outlet 172 and is threaded with the corresponding threads on the drain valve 170 mounted in a side wall of the pool. As threads are engaged, the drain plug 180 is forced open due to a plurality of prongs 116 being forced against the drain plug 180 from the outside. With the drain plug 180 removed by the prongs 116 extending from the plunger member 114, water has a clean drain path to the garden hose and out of the pool. Even if water pressure tries to close drain plug 180, the prongs 116 provide spaces between the prongs 116, as shown in FIG. 2, so that water can flow. Once draining is complete, the drain valve adapter 100 is removed and the drain valve cap is replaced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A drain valve adapter for use with a hose and a drain valve mounted to a container, wherein the drain valve defines a passageway for aqueous solution, the drain valve adapter comprising:
   a tubular body having a mating member and a plunger member which are in fluid communication with each other, the plunger member being configured to be disposed inside the drain valve along the passageway, wherein a length of the plunger member is sufficiently longer than a length of the drain valve so that at least one prong extending therefrom forces open a drain plug blocking the passageway of the drain valve and protrudes out of the drain valve to keep the drain plug open; and
   a ring cap defining a thorough hole and being disposed in surrounding relation to the tubular body for releasably engaging the drain valve.

2. The drain valve adapter of claim 1, wherein the plunger member has at least one prong extending therefrom to force open a drain plug blocking the passageway of the drain valve.

3. The drain valve adapter of claim 1, wherein the plunger member is sufficiently long to force open a drain plug blocking the passageway of the drain valve.

4. The drain valve adapter of claim 1, wherein the plunger member has a plurality of prongs extending therefrom, the plurality of prongs defining spaces therebetween to allow free flow of the aqueous solution in the container.

5. The drain valve adapter of claim 1, wherein the mating member has a threaded outer surface for engaging with a female coupler of the hose.

6. The drain valve adapter of claim 1, wherein the mating member has at least one compression fit sleeve for engaging the hose.

7. The drain valve adapter of claim 6, wherein the mating member has a plurality of compression fit sleeves of varying diameters for engaging hoses having various conduit diameters.

8. The drain valve adapter of claim 2, wherein the mating member has a threaded outer surface for engaging with a female coupler of the hose.

9. The drain valve adapter of claim 2, wherein the mating member has at least one compression fit sleeve for engaging the hose.

10. The drain valve adapter of claim 9, wherein the mating member has a plurality of compression fit sleeves of varying diameters for engaging hoses having various conduit diameters.

11. A tubular body for use in a drain valve adapter for use with a hose and a drain valve mounted to a container, wherein the drain valve defines a passageway for aqueous solution, the tubular body comprising:
    a mating member; and
    a plunger member connected to the mating member and is in fluid communication with each other, the plunger member being configures to be disposed inside the drain valve along the passageway, wherein the plunger member has at least one prong extending therefrom to force open a drain plug blocking the passageway of the drain valve, wherein a length of the plunger member is sufficiently longer than a length of the drain valve so that at least one prong extending therefrom protrudes out of the drain valve to keep the drain plug open.

12. The drain valve adapter of claim 11, wherein the plunger member is sufficiently long to force open a drain plug blocking the passageway of the drain valve.

13. The drain valve adapter of claim 11, wherein the plunger member has a plurality of prongs extending therefrom, the plurality of prongs defining spaces therebetween to allow free flow of the aqueous solution in the container.

14. The drain valve adapter of claim 11, wherein the mating member has a threaded outer surface for engaging with a female coupler of the hose.

15. The drain valve adapter of claim 11, wherein the mating member has at least one compression fit sleeve for engaging the hose.

16. The drain valve adapter of claim 15, wherein the mating member has a plurality of compression fit sleeves of varying diameters for engaging hoses having various conduit diameters.

17. The drain valve adapter of claim 13, wherein the mating member has a threaded outer surface for engaging with a female coupler of the hose.

18. The drain valve adapter of claim 13, wherein the mating member has at least one compression fit sleeve for engaging the hose.

19. The drain valve adapter of claim 18, wherein the mating member has a plurality of compression fit sleeves of varying diameters for engaging hoses having various conduit diameters.

20. A container for storing aqueous solution, the container comprising a drain valve defining a passageway for the aqueous solution; and a drain valve adapter for use with a house, the drain valve adapter comprising:

a tubular body having a mating member and a plunger member which are in fluid communication with each other, the plunger member being configured to be disposed sufficiently longer than a length of the drain valve so that at least on prong extending therefrom forces open a drain plug blocking the passageway of the drain valve and protrudes out of the drain valve to keep the drain plug open; and a ring cap defining a thorough hole and being disposed in surrounding relation to the tubular body for releasably engaging the drain valve.

21. The container of claim 20, wherein the plunger member has at least one prong extending therefrom to force open a drain plug blocking the passageway of the drain valve.

22. The container of claim 20, wherein the plunger member is sufficiently long to force open a drain plug blocking the passageway of the drain valve.

23. The container of claim 20, wherein the plunger member has a plurality of prongs extending therefrom, the plurality of prongs defining spaces therebetween to allow free flow of the aqueous solution in the container.

24. The container of claim 20, wherein the mating member has a threaded outer surface for engaging with a female coupler of the hose.

25. The container of claim 20, wherein the mating member has at least one compression fit sleeve for engaging the hose.

26. The container of claim 25, wherein the mating member has a plurality of compression fit sleeves of varying diameters for engaging hoses having various conduit diameters.

27. The container of claim 21, wherein the mating member has a threaded outer surface for engaging with a female coupler of a standard garden hose.

28. The container of claim 21, wherein the mating member has at least one compression fit sleeve for engaging the hose.

29. The container of claim 28, wherein the mating member has a plurality of compression fit sleeves of varying diameters for engaging hoses having various conduit diameters.

* * * * *

UNITED STATES PATENT AND TRADEMARK OFFICE
CERTIFICATE OF CORRECTION

PATENT NO. : 6,257,550 B1  Page 1 of 1
DATED : July 10, 2001
INVENTOR(S) : Richard A. Saputo, Hua Hsiang Lin and Yaw-Yuan Hsu It is certified that error appears in the above-identified patent and that said Letters Patent is hereby corrected as shown below:

Claims 2, 3, 8-10, 12, 21, 22 and 27-29 were cancelled. The remaining claims are to be renumbered as follows:

Claim 4 should be renumbered claim 2;
Claim 5 should be renumbered claim 3;
Claim 6 should be renumbered claim 4;
Claim 7 should be renumbered claim 5 and should depend from claim 4;
Claim 11 should be renumbered claim 6;
Claim 13 should be renumbered claim 7 and should depend from claim 6;
Claim 14 should be renumbered claim 8 and should depend from claim 6;
Claim 15 should be renumbered claim 9 and should depend from claim 6;
Claim 16 should be renumbered claim 10 and should depend from claim 9;
Claim 17 should be renumbered claim 11 and should depend from claim 7;
Claim 18 should be renumbered claim 12 and should depend from claim 7;
Claim 19 should be renumbered claim 13 and should depend from claim 12;
Claim 20 should be renumbered claim 14;
Claim 23 should be renumbered claim 15 and should depend from claim 14;
Claim 24 should be renumbered claim 16 and should depend from claim 14;
Claim 25 should be renumbered claim 17 and should depend from claim 14;
Claim 26 should be renumbered claim 18 and should depend from claim 17.

Signed and Sealed this

Twenty-seventh Day of April, 2004

JON W. DUDAS
*Acting Director of the United States Patent and Trademark Office*